(12) United States Patent
Shin et al.

(10) Patent No.: US 8,319,513 B2
(45) Date of Patent: Nov. 27, 2012

(54) INSPECTING APPARATUS FOR SOLAR CELL AND INSPECTING METHOD USING THE SAME

(75) Inventors: Myung-Hun Shin, Suwon-si (KR); Min-Seok Oh, Yongin-si (KR); Ku-Hyun Kang, Suwon-si (KR); Yuk-Hyun Nam, Goyang-si (KR); Seung-Jae Jung, Seoul (KR); Min Park, Seoul (KR)

(73) Assignees: Samsung Electronics Co., Ltd., Suwon-si, Gyeonggi-do (KR); Samsung SDI Co., Ltd., Yongin-si, Gyeonggi-do (KR)

( * ) Notice: Subject to any disclaimer, the term of this patent is extended or adjusted under 35 U.S.C. 154(b) by 626 days.

(21) Appl. No.: 12/505,364

(22) Filed: Jul. 17, 2009

(65) Prior Publication Data
US 2010/0060305 A1 Mar. 11, 2010

(30) Foreign Application Priority Data
Sep. 11, 2008 (KR) .................. 10-2008-0089824

(51) Int. Cl.
*G01R 31/26* (2006.01)
*G01R 31/20* (2006.01)

(52) U.S. Cl. .......... 324/761.01; 324/762.01; 324/754.01

(58) Field of Classification Search .. 324/762.01–762.1, 324/757.01, 754.23; 702/58, 109; 29/890.033; 60/641.15; 126/621–624, 638, 655
See application file for complete search history.

(56) References Cited

U.S. PATENT DOCUMENTS

| | | | | |
|---|---|---|---|---|
| 4,973,015 | A * | 11/1990 | Beaucoup et al. | 248/124.2 |
| 6,566,150 | B2 * | 5/2003 | Kohno et al. | 438/14 |
| 7,671,614 | B2 * | 3/2010 | Eldridge et al. | 324/750.19 |
| 7,847,237 | B2 * | 12/2010 | Fuyuki | 250/238 |

FOREIGN PATENT DOCUMENTS

| | | |
|---|---|---|
| JP | 2000-035465 A | 2/2000 |
| KR | 1999-0014615 | 5/1999 |
| KR | 100444251 B1 | 3/2004 |
| KR | 10044251 B1 | 8/2004 |
| KR | 1020050045971 A | 5/2005 |
| KR | 100653746 B1 | 11/2006 |
| KR | 1020070080231 A | 8/2007 |

* cited by examiner

*Primary Examiner* — Tung X Nguyen
(74) *Attorney, Agent, or Firm* — Lee & Morse, P.C.

(57) ABSTRACT

An inspecting apparatus for a solar cell and an inspecting method are provided. The inspecting apparatus for the solar cell includes a head unit having a plurality of probe units, a rotation unit rotating the head unit according to an interval of cells of the solar cell, a controller controlling a rotation angle of the head unit by controlling the rotation unit, and a wire unit connected to the head unit to be electrically connected to the probe units.

13 Claims, 5 Drawing Sheets

INSPECTING APPARATUS FOR SOLAR CELL AND INSPECTING METHOD USING THE SAME

CROSS-REFERENCE TO RELATED APPLICATION

This application claims priority to and the benefit of Korean Patent Application No. 10-2008-0089824 filed in the Korean Intellectual Property Office on Sep. 11, 2008, the entire content of which is incorporated herein by reference.

BACKGROUND OF THE INVENTION (a) Field of the Invention

The present invention relates to an inspecting apparatus for a solar cell of a thin film type and an inspecting method using the same.

(b) Description of the Related Art

A solar cell is a photovoltaic device for converting light energy into electrical energy. Generally, a solar cell of a thin film type has a structure that includes a plurality of cells coupled in series to a plane surface. During manufacturing, areas between the unit cells are inspected for pattern defects and each of the cells is inspected for normal operation.

In a solar cell of the thin film type, a plurality of cells are coupled in series to a plane surface, and the interval between the cells is adjusted according to the particular design method that is used and the structure of the solar cell. The structure can be generally divided into tandem cells and single cells. In the case of a tandem cell, the voltage generated by each cell is high. Hence, when using tandem cells, increasing the area of the unit cell results in an overall increase of the energy that is generated. In the case of a single cell, in which the generated voltage is low relative to the current generated in each unit cell, it may be preferable to decrease the area of each unit cell and increase the number of cells. Also, the amount of generated current is large and the voltage is low in the case of a compound solar cell using $CuInGaSe_2$ as a material, compared with an amorphous solar cell.

Accordingly, by designing a solar cell with a compound material as opposed to amorphous silicon allows the solar cell to be designed with narrower spacing between neighboring unit cells to minimize the area of the unit cell and a higher number of cells. That is, if each solar cell is formed with the most suitable structure, the size of the cell could be different for every solar cell.

This variation in the unit cell size and arrangement poses a challenge during the inspection process, during which a plurality of probe units simultaneously contact the plurality of cells for inspection through electrical switching to test or repair them by effectively probing the plurality of cells. Particularly, a multi-probing unit would need a function for changing the interval between each probe unit according to the different characteristics or the different structures of the solar cells.

However, the capability to simultaneously and uniformly reduce the interval of the individual probe unit is limited by an alignment margin of the individual probe units or the number of multi-probe units that will be used.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention provides an inspecting apparatus for a solar cell for probing cells even though an interval between the cells is changed.

An inspecting apparatus for a solar cell according to an exemplary embodiment of the present invention includes: a head unit having a plurality of probe units; a rotation unit rotating the head unit according to the interval of cells of the solar cell; a controller controlling a rotation angle of the head unit by controlling the rotation unit; and a wire unit to be connected to the head unit to be electrically connected to the probe units.

When the interval between the cells of the solar cell is "A" and the interval between the neighboring probe units is "S", the head unit may be rotated by the rotation angle θ that is satisfied by the Equation below.

$$A = S * \cos \theta$$

The rotation unit may include a rotation shaft connected to the center of the head unit, and a power unit transmitting the power for rotating the rotation shaft.

The inspecting apparatus may further include a measuring unit determining the rotation angle of the rotation unit according to the interval between the cells of the solar cell.

The inspecting apparatus may further include an X-Y stage for moving the solar cell.

The head unit may include a plurality of head units.

The plurality of head units may have different rotation angles.

A method for inspecting a solar cell according to another exemplary embodiment of the present invention includes moving a head unit having a plurality of probe units on a solar cell having a plurality of cells, rotating the head unit for the probe units to respectively correspond to the cells, and probing the probe units of the head unit to contact each of the cells.

In the rotation of the head unit, when the interval between the cells of the solar cell is "A" and the interval between the neighboring probe units is "S", the head unit may be rotated by the rotation angle θ that is satisfied by the Equation below.

$$A = S * \cos \theta.$$

In the rotation of the head unit, a rotation unit including a rotation shaft connected to the center of the head unit and a power unit transmitting power for rotating the rotation shaft may be used.

Before rotating the head unit, the interval between the cells of the solar cell may be measured to determine the rotation angle of the head unit.

The head unit may include a plurality of head units arranged on the solar cell.

The plurality of head units may be rotated with different rotation angles in the rotation of the head unit.

According to the present invention, the rotation shaft is added on the center of the multi-probe unit such that the range of the interval between the cells through the probe unit for probing each of the cells of the solar cell may be expanded.

DETAILED DESCRIPTION OF THE EMBODIMENTS

Figure 1:
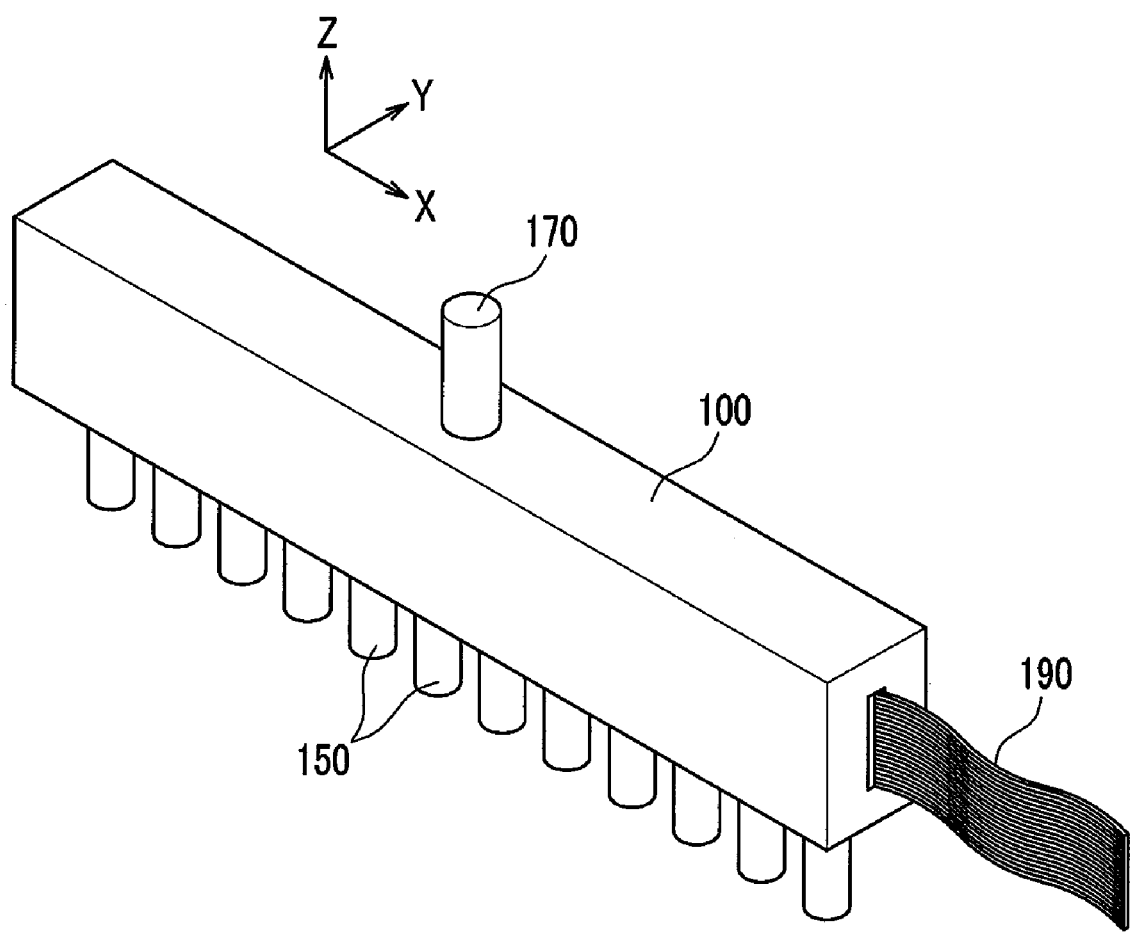
FIG. 1 is a perspective view of an inspecting apparatus for a solar cell according to an exemplary embodiment of the present invention.

Exemplary embodiments of the present invention will be described in detail with reference to the accompanying drawings. However, the present invention is not limited to exemplary embodiments described herein, but may be embodied in other forms. Rather, exemplary embodiments described herein are provided to thoroughly and completely explain the disclosed contents and to sufficiently transfer the ideas of the present invention to a person of ordinary skill in the art.

In the drawings, the thickness of layers and regions is exaggerated for clarity. It is to be noted that when a layer is referred to as being "on" another layer or substrate, it can be directly formed on another layer or substrate or can be formed another layer or substrate through a third layer interposed therebetween. Like constituent elements are denoted by like reference numerals denotes throughout the specification.

Figure 2:
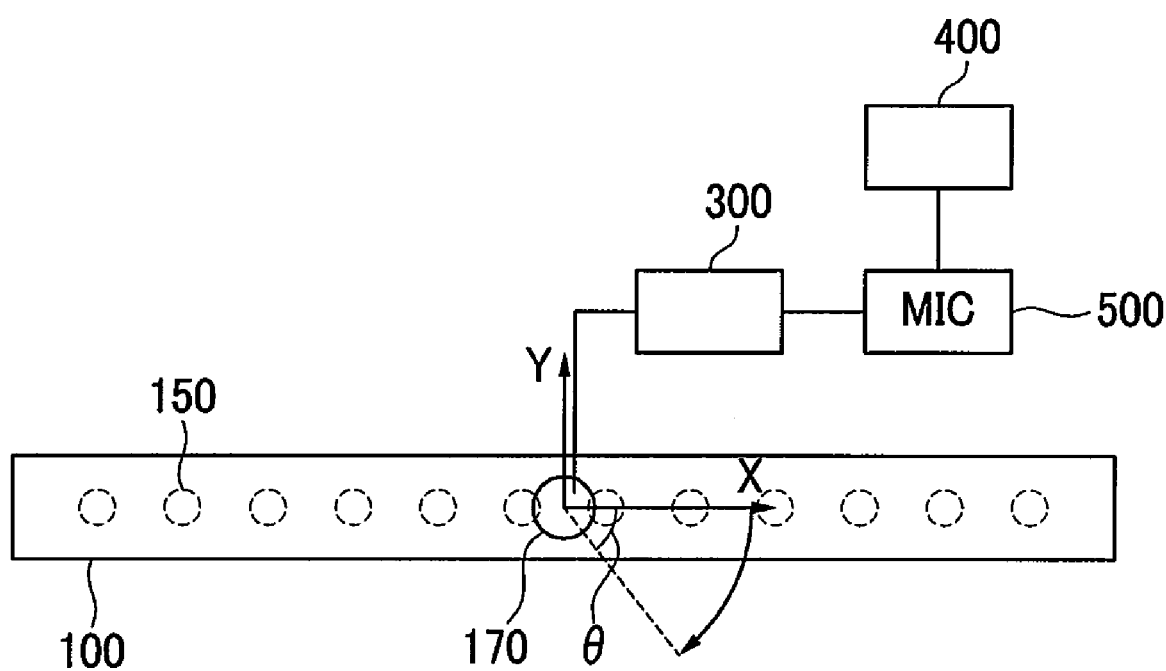
FIG. 2 is a top plan view showing an inspecting apparatus for a solar cell according to an exemplary embodiment of the present invention.

FIG. 1 is a perspective view of an inspecting apparatus for a solar cell according to an exemplary embodiment of the present invention. FIG. 2 is a top plan view showing an inspecting apparatus for a solar cell according to an exemplary embodiment of the present invention.

Referring to FIG. 1 and FIG. 2, a solar cell inspecting apparatus according to an exemplary embodiment of the present invention includes a head unit 100. The head unit 100 is connected to a plurality of probe units 150, which are disposed in a line at a uniform interval on a surface of the head unit 100. A wire unit 190 including a group of wires respectively connected to the probe units 150 passes through another surface of the head unit 100. The probe units 150 and the wires of the wire unit 190 may be respectively connected to each other (e.g., so that each wire connects to one of the probe units 150) inside the head unit 100.

A rotation shaft 170 is positioned on the head unit 100, at the center of the surface that is opposite to the surface connected to the probe units 150. The rotation shaft 170 may be rotated clockwise or anticlockwise. Although the probe units 150 connected to the head unit 100 are simultaneously moved according to the rotation of the rotation shaft 170, the interval between each of the probe units 150 is uniformly maintained.

A power unit 300 transmitting power for rotating the rotation shaft 170 is connected to the rotation shaft 170. The inspecting apparatus according to an exemplary embodiment of the present invention includes a controller 500 for controlling a rotation angle θ of the rotation shaft 170 that is rotated by the power unit 300. The controller 500 may be a microprocessor.

In addition, a measuring unit 400 for determining the rotation angle θ by which the rotation shaft 170 may be rotated may be included in the inspection device. The measuring unit 400 measures the cell interval of the solar cell that is being inspected. Also, an inspecting table (not shown) for fixing the solar cell that is being inspected, and an X-Y stage (not shown) for moving the solar cell in the X-Y direction (shown in FIG. 2) may be further included.

A plurality of head units 100 are arranged on the solar cell that is an inspecting subject, and different head units 100 may have different rotation angles.

Figure 3:
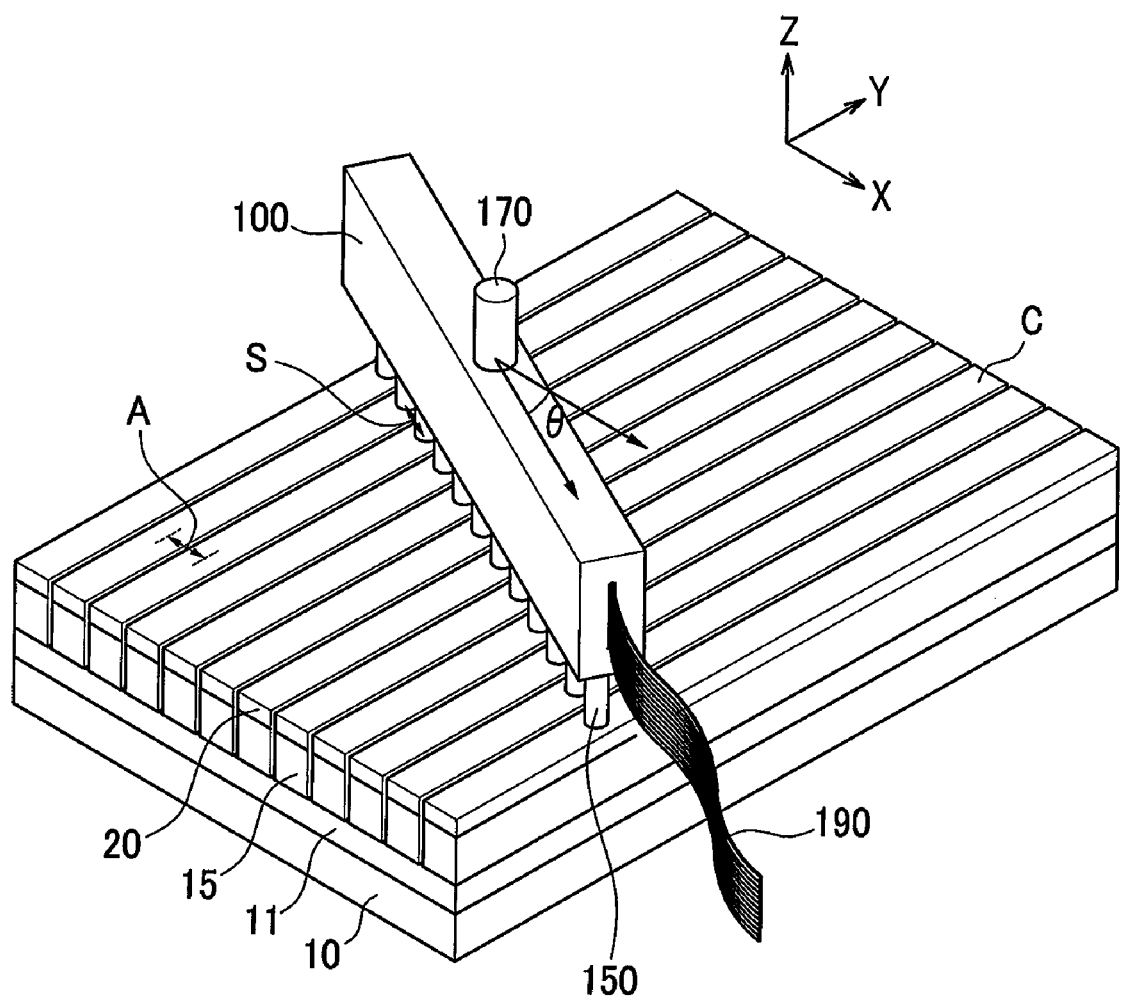
FIG. 3 is a perspective view showing a method for inspecting a solar cell according to another exemplary embodiment of the present invention.

FIG. 3 is a perspective view showing a method for inspecting a solar cell according to another exemplary embodiment of the present invention.

Referring to FIG. 3, a head unit 100 having a plurality of probe units 150 is moved on the solar cell including a plurality of cells C. The solar cell may be disposed on an inspecting table (not shown).

In manufacturing the solar cell, a transparent conductive layer 11 is deposited on a glass substrate 10. The transparent conductive layer 11 is patterned by laser scribing.

Next, a semiconductor layer 15 as a light absorption layer is deposited on the patterned transparent conductive layer 11, and then the semiconductor layer 15 is patterned by laser scribing. Suitable deposition techniques and conventional laser scribing methods are well known.

Next, a rear electrode layer 20 is deposited on the semiconductor layer 15.

Next, the rear electrode layer 20 and the semiconductor layer 15 are patterned to form the solar cell including a plurality of cells C.

To confirm the normal operation of the cells C of the solar cell, the plurality of probe units 150 must be contacted with the plurality of cells C. To achieve this, the interval A between the plurality of cells C must be equal to the interval of probe units such that the following process is executed.

The head unit 100 is rotated so that each of the probe units 150 contacts one of the cells C.

After probing by using the solar cell inspecting apparatus according to the embodiment of the present invention, the inspecting subject may be changed to a solar cell having a different interval A between the cells. Here, the interval of the probing must be changed according to the change of the interval A between the cells.

In detail, the head unit 100 is rotated by the rotation angle θ to satisfy Equation 1.

$$A = S * \cos\theta \qquad \text{(Equation 1)}$$

Here, A is the interval between the cells of the solar cell, and S is the interval between the neighboring probe units.

Next, the head unit 100 is moved in the direction perpendicular to the X-Y plane surface for the probe units 150 to be respectively contacted with the plurality of cells C. Here, a test voltage is applied through the wire unit 190 to probe whether each cell of the solar cell is normally operated.

The interval A of the cells of the solar cell having the plurality of cells C may be changed depending on the kind of solar cell. In the conventional solar cell inspecting apparatus, a multi-probe unit has a fixed distance between each of the units. Accordingly, if the interval A between the cells of the solar cell changes, each probe unit is individually varied or the entire head unit must be replaced.

However, in the inspecting method using the solar cell inspecting apparatus according to an exemplary embodiment of the present invention, the rotation shaft 170 connected to the head unit 100 is rotated such that the interval of the probing can be adjusted to correspond with the interval A between the cells to respectively contact the probe units 150 and the cells C to each other.

Again referring to FIG. 2, the power unit 300 connected to the rotation shaft 170 transmits power to the rotation shaft 170. Also, the controller 500 as the microprocessor controls the rotation angle θ of the rotation shaft 170.

Before rotating the head unit 100, the rotation angle θ of the head unit 100 may be measured by measuring the interval A of the cells of the solar cell through the measuring unit 400.

Figure 4:
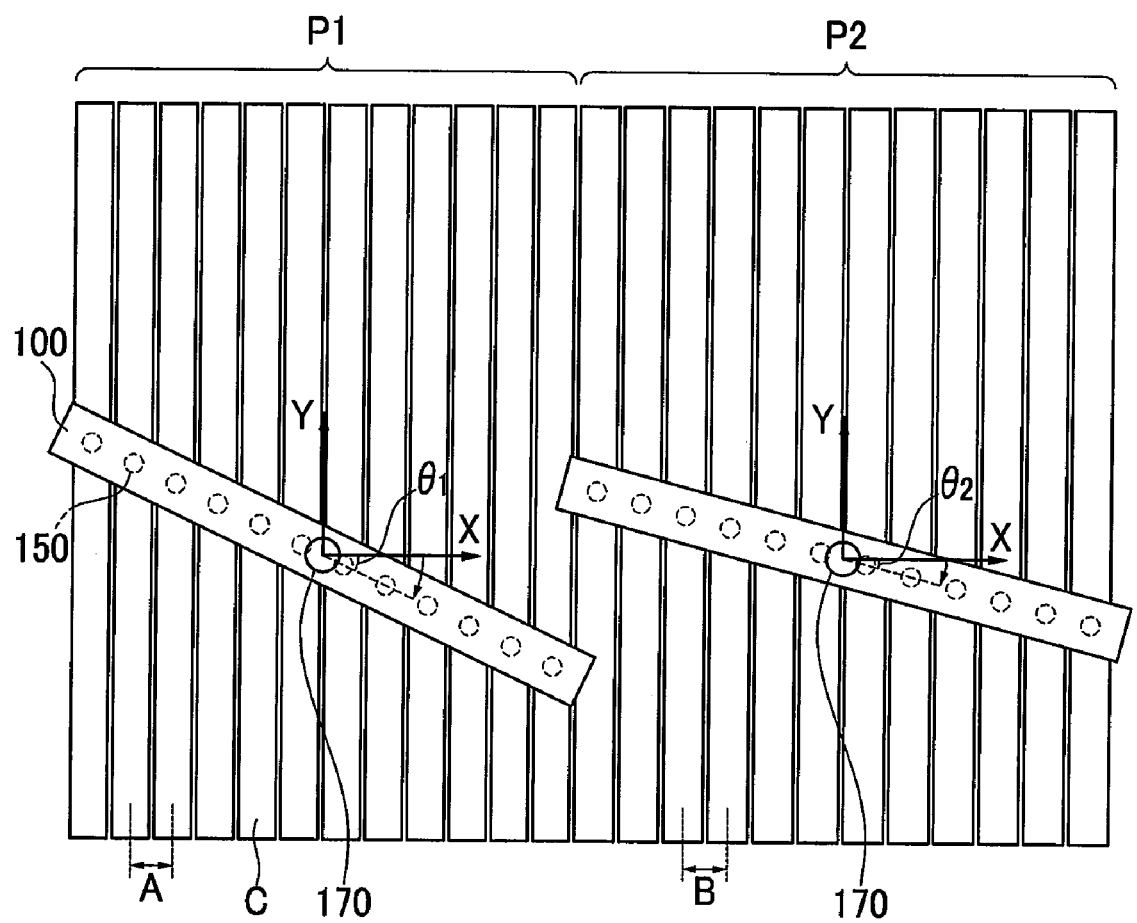
FIG. 4 is a top plan view showing a method for inspecting a solar cell according to another exemplary embodiment of the present invention.

FIG. 4 is a top plan view showing a method for inspecting a solar cell according to another exemplary embodiment of the present invention.

Referring to FIG. 4, a plurality of head units 100 are arranged on a plurality of cells C of a solar cell that is being inspected. When the cells C are divided into a first portion P1 and a second portion P2, the interval A between the cells of the first portion may be different from the interval B between the cells of the second portion. In this case, the head units 100 are rotated with different rotation angles $\theta_1$ and $\theta_2$ such that the head units 100 may respectively correspond to the cells with different intervals.

Figure 5:
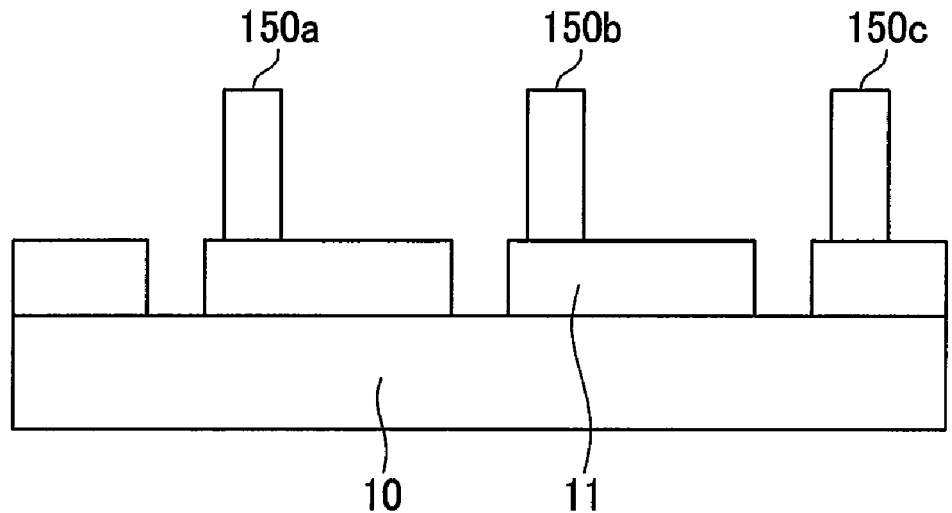
FIG. 5 and FIG. 6 are cross-sectional views showing the general inspecting method for a solar cell.
Figure 6:
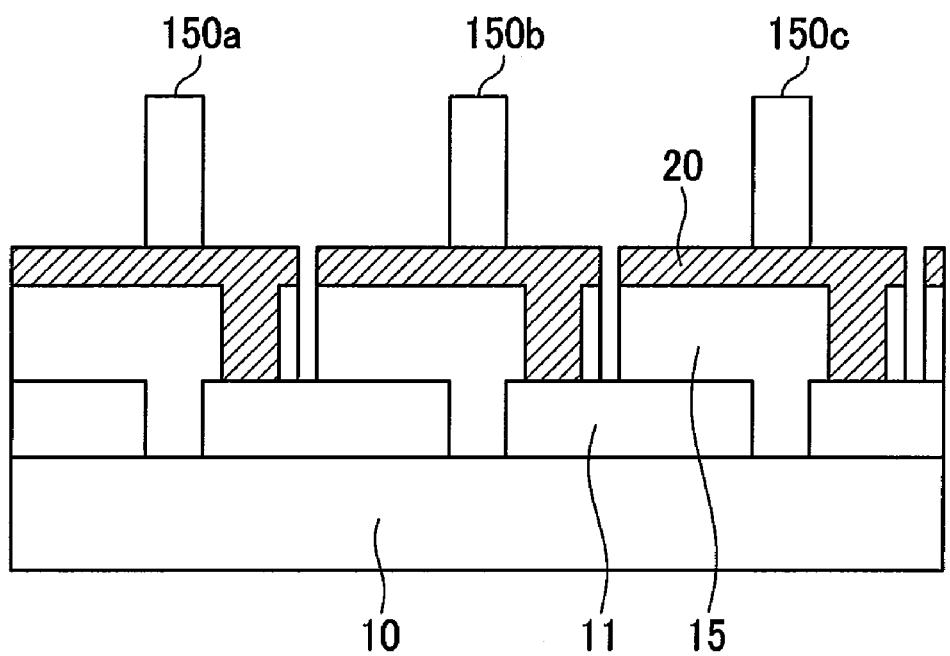

FIG. 5 and FIG. 6 are cross-sectional views showing a general method for inspecting a solar cell.

Referring to FIG. 5, a transparent conductive layer 11 is deposited on a substrate 10 and patterned. To confirm whether the patterning process is executed properly, a plurality of probe units 150a, 150b, and 150c connected to a head unit 100 (not shown) are arranged to contact the transparent conductive layer 11, as shown in FIG. 5. Here, any defects of the patterns may be confirmed by measuring the resistance between the patterns of the transparent conductive layer 11.

Referring to FIG. 6, a rear electrode layer 20 is deposited according to the general manufacturing method of the solar cell and patterned, and then a plurality of probe units 150a, 150b, and 150c are arranged to contact the rear electrode layer 20. The probe units 150a and 150b are applied with the voltage and the current flows between the probe units 150a and 150b to measure the rectifying characteristic of the diode current such that it may be confirmed whether the cells are normally operated and the patterns are correctly formed.

The example of a solar cell being inspected has been described. However, the invention is not limited to the specific type of solar cell inspection that is described and may be applied to the case where several intervals of the probing are simultaneously varied.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An inspecting apparatus for a solar cell, the inspecting apparatus comprising:
   a head unit having a plurality of probe units;
   a rotation unit rotating the head unit according to an interval between cells of the solar cell;
   a controller controlling a rotation angle of the head unit by controlling the rotation unit; and
   a wire unit connected to the head unit to be electrically connected to the probe units,
   wherein, when the interval between the cells of the solar cell is "A" and an interval between the neighboring probe units is "S", the head unit is rotated by the rotation angle θ that is satisfied by the Equation below:

$A = S * \cos \theta.$

2. The inspecting apparatus of claim 1, wherein the rotation unit includes:
   a rotation shaft connected to the center of the head unit, and
   a power unit transmitting power for rotating the rotation shaft.

3. The inspecting apparatus of claim 2, further comprising a measuring unit determining the rotation angle of the rotation unit according to the interval between the cells of the solar cell.

4. The inspecting apparatus of claim 1, further comprising an X-Y stage for moving the solar cell.

5. The inspecting apparatus of claim 1, wherein the head unit comprises a plurality of head units.

6. The inspecting apparatus of claim 5, wherein the plurality of head units have different rotation angles θ.

7. A method for inspecting a solar cell, the method comprising:
   moving a head unit having a plurality of probe units on a solar cell that has a plurality of cells;
   rotating the head unit for the probe units to correspond to the cells, respectively; and
   probing the probe units of the head unit to contact the cells, wherein, in the rotation of the head unit, when an interval between the cells of the solar cell is "A" and an interval between the neighboring probe units is "S", the head unit is rotated by a rotation angle θ that is satisfied by Equation 1 below:

$A = S * \cos \theta.$

8. The method of claim 7, wherein the rotating of the head unit includes using a rotation unit having a rotation shaft connected to the center of the head unit and a power unit transmitting power for rotating the rotation shaft.

9. The method of claim 7, further comprising, before rotating the head unit,
   measuring the interval between the cells of the solar cell to determine the rotation angle θ of the head unit.

10. The method of claim 7, wherein the head unit comprises a plurality of head units arranged on the solar cell.

11. The method of claim 10, wherein the plurality of head units are rotated with different rotation angles θ in the rotation of the head unit.

12. An inspecting apparatus for a solar cell, the inspecting apparatus comprising:
    a head unit having a plurality of probe units;
    a rotation unit rotating the head unit according to an interval between cells of the solar cell, the rotation unit including a rotation shaft connected to the center of the head unit and a power unit that transmits power for rotating the rotation shaft;
    a measuring unit determining a rotation angle of the rotation unit according to the interval between the cells of the solar cell;
    a controller controlling the rotation angle of the head unit by controlling the rotation unit; and
    a wire unit connected to the head unit to be electrically connected to the probe units.

13. A method for inspecting a solar cell, the method comprising:
    moving a head unit having a plurality of probe units on a solar cell that has a plurality of cells;
    rotating the head unit for the probe units to correspond to the cells, respectively;
    probing the probe units of the head unit to contact the cells, and
    before rotating the head unit, measuring the interval between the cells of the solar cell to determine the rotation angle of the head unit.

* * * * *